(12) United States Patent
Cotton et al.

(10) Patent No.: US 12,233,615 B2
(45) Date of Patent: Feb. 25, 2025

(54) TIRE SENSOR INSTALL TOOL

(71) Applicant: COMPAGNIE GENERALE DES ETABLISSEMENTS MICHELIN, Clermont-Ferrand (FR)

(72) Inventors: Raymond Cotton, Travelers Rest, SC (US); Philippe Barreaud, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 13 days.

(21) Appl. No.: 18/044,530

(22) PCT Filed: Oct. 6, 2020

(86) PCT No.: PCT/US2020/054379
§ 371 (c)(1),
(2) Date: Mar. 8, 2023

(87) PCT Pub. No.: WO2022/075973
PCT Pub. Date: Apr. 14, 2022

(65) Prior Publication Data
US 2023/0321935 A1  Oct. 12, 2023

(51) Int. Cl.
*B29D 30/00* (2006.01)
(52) U.S. Cl.
CPC .. *B29D 30/0061* (2013.01); *B29D 2030/0072* (2013.01)
(58) Field of Classification Search
CPC ........ B29D 2030/0083; B29D 30/0061; B25B 27/0035; B60C 23/0493
See application file for complete search history.

(56) References Cited

U.S. PATENT DOCUMENTS

2017/0225525 A1   8/2017   Landis

FOREIGN PATENT DOCUMENTS

| DE | 102015119540 B3 | 12/2016 | |
| EP | 3357676 A1 * | 8/2018 | ............. B23P 19/04 |
| JP | 6684528 B2 | 9/2017 | |

OTHER PUBLICATIONS

European Patent Office, International Search Report for PCT/US2020/054379, dated May 21, 2021, pp. 1-09 (included), European Patent Office, Rijswijk, The Netherlands.

* cited by examiner

*Primary Examiner* — Cedrick S Williams
(74) *Attorney, Agent, or Firm* — Neal P. Pierotti

(57) ABSTRACT

An apparatus for installing a sensor into a tire is provided that has a housing with a housing base that defines a housing base opening with an axis. A first finger extends from the housing base so as to extend both away from the housing base in the axial direction and towards the axis upon initial extension from the housing base and is located towards the axis without external force applied to the first finger. The housing also has a second finger that extends from the housing base. Also included is a push rod with a push rod base and a rod that extends from the push rod base. The rod has an operative end configured for engagement with the sensor. The rod is configured for moving through the housing base opening such that the operative end is configured for moving through the housing base opening.

12 Claims, 9 Drawing Sheets

TIRE SENSOR INSTALL TOOL

CROSS-REFERENCE TO RELATED APPLICATIONS

The present application is a 35 U.S.C. § 371 application of PCT/US2020/054379 filed on Oct. 6, 2020 and entitled "Tire Sensor Install Tool" and claims benefit thereto. The entire contents of PCT/US2020/054379 are incorporated by reference herein in their entirety for all purposes.

FIELD OF THE INVENTION

The subject matter of the present invention relates to an apparatus for installing a sensor into a tire that is capable of sensing parameters of the tire. More particularly, the present application involves an apparatus that has a housing and a push rod that opens up the container, allows the sensor to be properly oriented relative to the tire, and then inserts the sensor into the container.

BACKGROUND OF THE INVENTION

It is known to place sensors into the tires of vehicles in order to measure such things as tire inflation pressure, tire temperature, tire acceleration, tire velocity, and other parameters. Such electronic sensors typically require a container to be fixed inside of the tire into which the sensor is disposed and retained. The container can have a cavity into which the electronic sensor is placed, and one known sensor container includes a lip that surrounds a portion of the top of an electronic sensor and holds it in place in the cavity. The lip is made of a flexible material and is peeled or inverted upward to allow the sensor to be pushed past it and into the cavity. The flexible lip can then be flipped back into its original position, and in so doing engage the sensor and function to retain it in the cavity. The holding of the electronic sensor within the tire should be strong enough to keep the electronic sensor in place upon being subjected to high acceleration, forces, and temperatures during operation of the vehicle.

In order to place a sensor within a container of a tire, tools for doing so have been developed. One such tool is disclosed in German reference DE 20 2015 106 124 U1 that shows a housing device with four fingers that extend linearly from a housing and then bend towards the central axis so as form a generally closed interior. A plunger is within this interior, and a rod of the plunger extends back through the housing to a handle. A user will pry the fingers apart and then insert a sensor into this now open interior and against the plunger. The entire tool with the now inserted sensor is placed against a container and the ends of the fingers are pushed into this closed container. Force is applied to the handle of the plunder and the plunger and the sensor engage the fingers and push them outward which in turns causes the fingers to open up the container to allow for room for the sensor to be placed within the container. Pulling the plunger back causes the fingers to be first disengaged with the plunger remaining within the container. Since the plunger is still contacting the sensor with the container it could be moved out of place within the container, so the user must be very careful to then pull the plunger out of the container without moving the orientation or position of the sensor within the container. Aside from being difficult to initially insert the sensor within the closed interior of the device, this reference requires the plunger and the housing to be made out of multiple parts, thus limiting their flexibility in being built with certain manufacturing methods and certain materials.

Another design for a tool that is capable of inserting a sensor into a container of a tire is disclosed in Japanese reference JP 2017-154629. This reference includes a plunger that moves through a housing with the sensor on the end of the plunger. The housing has eight fingers that extend in a liner direction from the base of the housing and maintain a constant distance from the center axis along their length. The installer uses separate tools to push the eight fingers into the container on the tire. Next, the installer pushes the plunger down to cause the sensor to engage the eight fingers and in turn push the container open far enough to accept the sensor therein. Once the sensor is seated within the container, the plunger can be lifted from the seated sensor. Although capable of installing a sensor within a container, this reference requires additional tools to be used and the use of eight fingers limits the materials and manufacturing methods that can be used to create the device. The fingers must be made out of separate materials from the rest of the apparatus due to there being so many of them and their size. As such, multiple materials must be used to construct both the plunger and the housing portion of the device. Further, there is no indexing feature present in this design so one does not know the appropriate orientation of the sensor relative to the tire during installation.

A problem thus exists in the provision of tools to install a sensor within a tire in which one does not know the orientation of the sensor relative to the tool or tire, and in which manufacturing methods and materials of construction are limited, and in which finger designs are not present to consistently and accurately place the sensor within the container. As such, room for variation and improvement remain within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
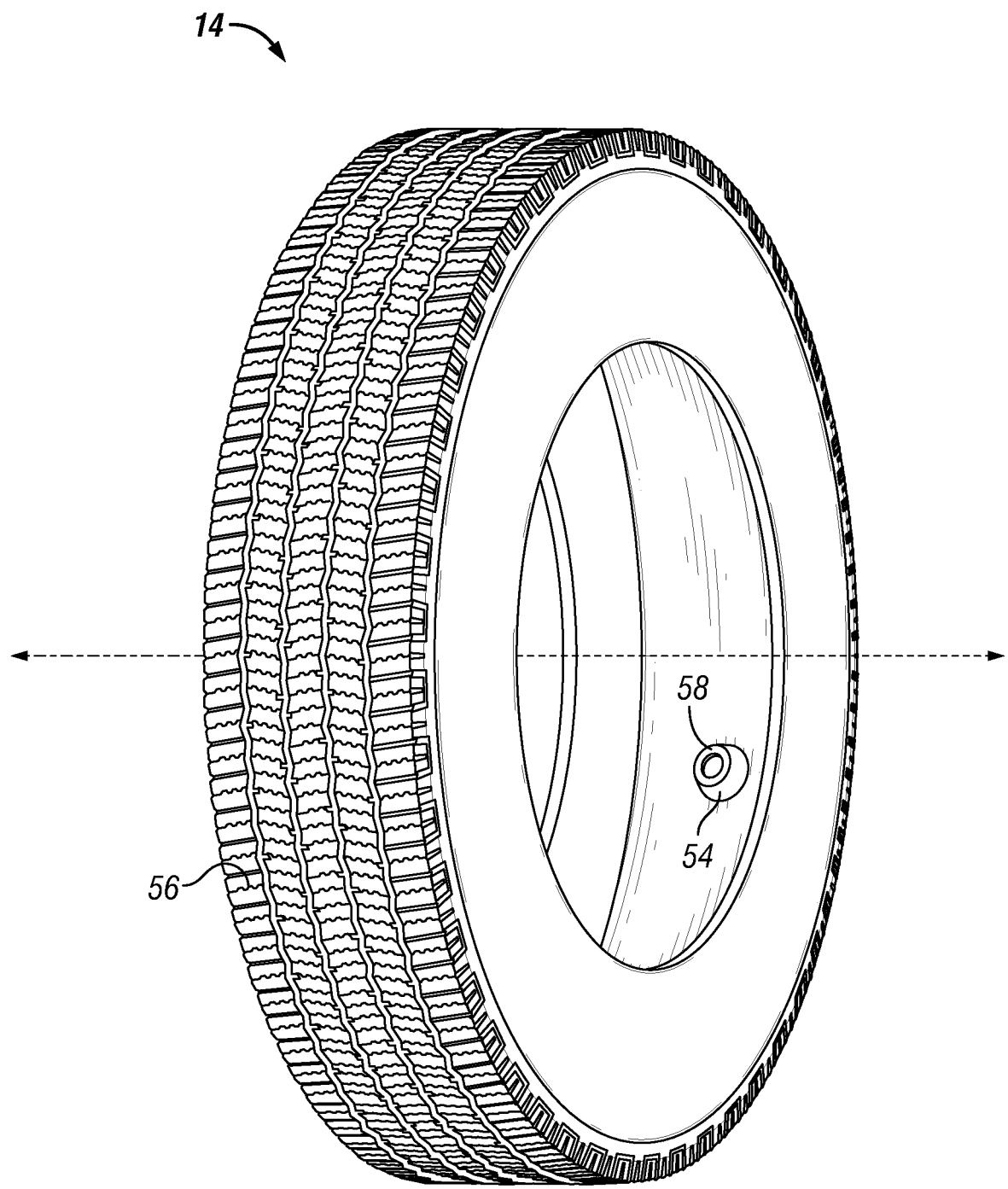
FIG. 1 is a perspective view of tire that has a container into which a sensor is to be placed.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an apparatus 10 that has is used to insert a sensor 12 into a tire 14. The apparatus 10 includes both a housing 16 and a push rod 30 that can move relative to the housing 16. The tire 14 includes a container 54 into which the sensor 12 is to be placed. The housing 16 may be first positioned relative to the container 54 so that an end of fingers 26, 28 of the housing 16 are inserted into the container 54. The sensor 12 is placed onto an operative end 36 of the rod 34 of the push rod 30, and the sensor 12 and rod 34 can be moved linearly through a housing base opening 20 of a base 18 of the housing 16. The fingers 26, 28 are biased inwards towards an axis 22, and upon movement of the sensor 12 through the housing 16 it will eventually engage the two fingers 26, 28 and force them outward and away from the axis 22. This outward movement is in turn imparted to the container 54 to cause its wall to expand to allow insertion of the sensor 12 into the container 54. The installer may continue to apply force to the push rod 30 to force the sensor 12 down into the container 54 and against its bottom surface or against the tire outer surface at the bottom of the container 54 depending upon how the container 54 is constructed. With this positive force applied, the end of the fingers 26, 28 are forced out of the container 54 and the housing 16 snaps back away from the tire 14. An indexing feature 42 could be provided on the push rod 30 so that the installer can correctly position the sensor 12 relative to the tire 14 for sensor installs that require the sensor 12 be oriented a particular way in order to properly function.

FIG. 1 shows a tire 14 with tread 56 that extends completely 360 degrees around the tire 14 in the circumferential direction of the tire 14. The tire 14 has a pair of sidewalls that are included in a carcass portion of the tire 14 onto which the tread 56 is located. An inner surface of the tire 14 is located opposite the tread 56 and extends between the inner sides of the first sidewall and the second sidewall. The container 54 is formed on the inner surface and extends from the inner surface towards an axis of the tire 14 in a radial direction of the tire 14 such that the container 54 is located closer to the central axis than the inner surface. The tread 56 is at the outer surface of the tire 14 and resides on top of a carcass of the tire 14 that can include a number of layers that may have belts therein. The inner surface of the tire 14 includes the container 54. The container 54 may be made out of the same material as that which makes up the inner surface, or could be made out of a different material than the inner surface. The container 54 may be thought of as being part of the inner surface or may be thought of as being attached to the inner surface. This is because the container 54 could be made out of a layer or patch of cushion gum that is placed onto the inner surface of the green tire 14 before curing. Once cured, this layer or patch of cushion gum can form the container 54 and it may be referred to as being on the inner surface, or may be referred to as being part of the inner surface as these two descriptions are interchangeable with one another as used herein the present application. Regardless, the container 54 is integrally formed with the inner surface because the container 54 is formed at the same time the inner surface of the tire 14 is cured in the mold. Other mechanisms of forming the container 54 are possible such as separately forming the container 54 and then subsequently attaching it to the inner surface.

The container 54 has an internal void into which a sensor 12, such as an electronic sensor 12, could be located. A sidewall of the container 12 extends upwards from the inner surface in the radial direction of the tire 14, over 9 millimeters in some arrangements, and can be of any shape such as circular, oval, or rectangular. In other embodiments, the sidewall of the container 54 extends from 8 to 10 millimeters, from 8 to 13 millimeters, from 12 to 20 millimeters, or greater than 12 millimeters in the radial direction from the inner surface. The container 54 has a lip 58 that extends from the sidewall at the portion of the sidewall that is closest to the axis of the tire 14 to cover a portion of the cavity of the container 54. An opening into the interior of the container 54 is defined by the lip 58 to allow the sensor 12 to be placed therein. As previously described, the lip 58 could be peeled up to allow insertion of the sensor 12 and then subsequently pushed back into the FIG. 1 position to securely hold the sensor 12 into the container 54. The container 54 may be configured so that only a single, and no more than a single, opening into the interior of the container 54 exists and faces only in the radial direction of the tire 14, and does not face in the axial direction.

Figure 2:
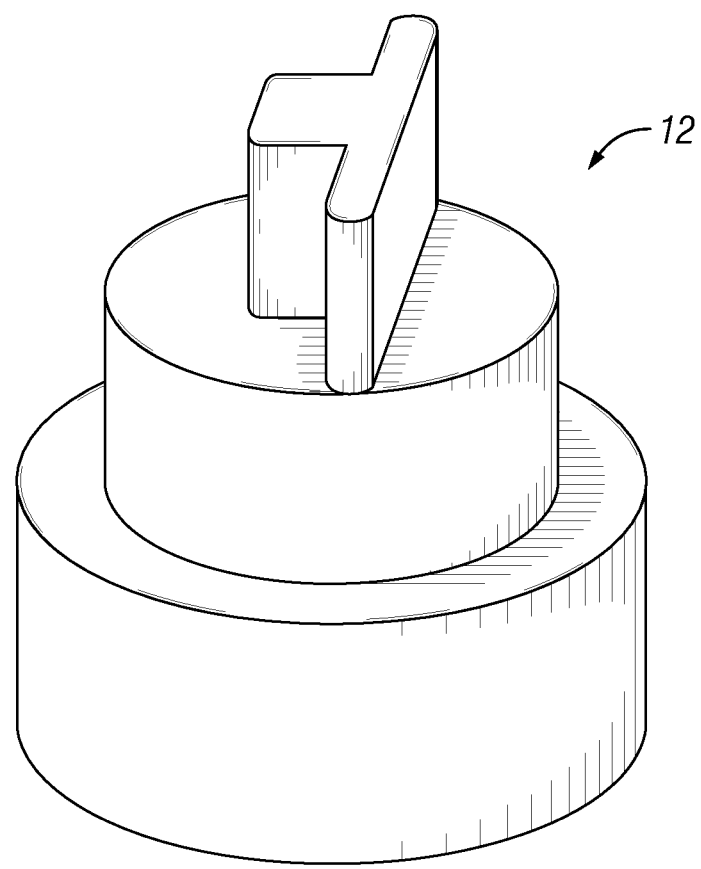
FIG. 2 is a perspective view of a sensor that is to be placed into a tire for measuring parameters of the tire.

A sensor 12 that can be inserted into the container 54 is shown with reference to FIG. 2. The sensor 12 can be designed in a number of different ways, and the manner disclosed in FIG. 2 is only one design of many. The sensor 12 has a cylindrical shaped lower body onto which a smaller cylindrically shaped upper body is disposed. On top of the upper body, a T-shaped protrusion extends that is the highest point of the sensor 12. The sensor 12 can be used to measure any desired parameter such as temperature, pressure, and/or acceleration, and can be used to identify the tire 14. The sensor 12 could be designed to not only output information but could additionally receive information and may process information in some circumstances. The sensor 12 may be required to be in a certain orientation in the tire 14 in order to accurately sense one or more desired parameters. This might be because the antenna of the sensor 12 needs to be in a particular orientation relative to the tire 14 to sense parameters or to send signals to a receiver outside of the tire 14. In this regard, the T-shaped protrusion of the sensor 12 functions as a guide to the installer to identify a particular orientation of the sensor 12. The installer may arrange the sensor 12 so that the T-shaped protrusion is pointing a particular way in regard to the inner surface or axis of the tire 14 so that the sensor 12 is properly oriented for use. Although shown as having the protrusions, upper body, and lower body, alternative designs of the sensor 12 are possible that do not have these elements, and such sensors 12 could still be inserted by the present apparatus 10 into the container 54.

Figure 3:
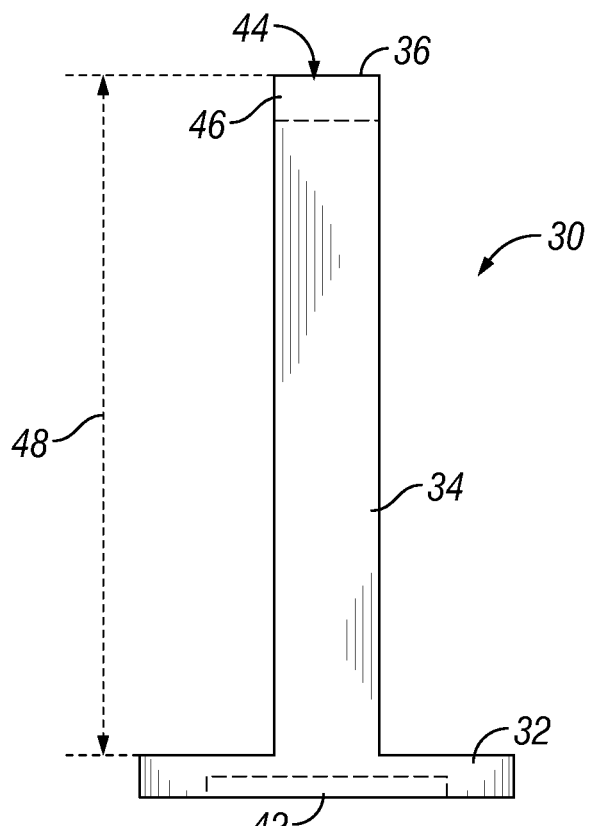
FIG. 3 is a front elevation view of a push rod of an apparatus for installing a sensor into a tire.
Figure 4:
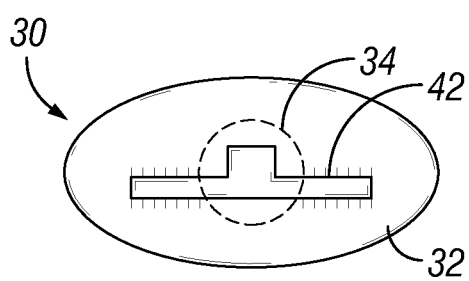
FIG. 4 is a top view of FIG. 3
Figure 5:
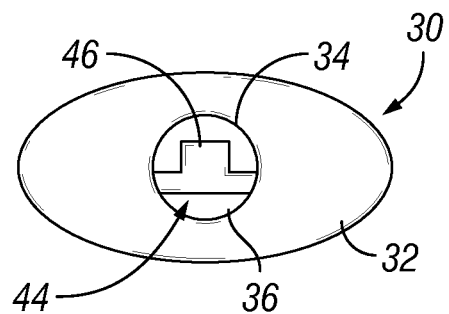
FIG. 5 is a bottom view of FIG. 3.

The apparatus 10 includes a housing 16 and a push rod 30. One exemplary embodiment of the push rod 30 is shown in FIGS. 3-5. The push rod 30 has a push rod base 32 and a rod 34 that extends from the push rod base 32. The push rod base 32 is wider than the rod 34 and is ovoid in shape. The rod 34 extends from the push rod base 32 and has a length 48, terminating at an operative end 36. The rod 34 is cylindrical in shape but could be differently shaped in other embodiments. The operative end 36 is the portion of the push rod 30 that is designed to interact with the sensor 12. The operative end 36 has a terminal face 44 which is the face farthest from the push rod base 32. The terminal face 44 can be a flat face, and a depression 46 extends into the terminal face 44. The depression 46 is a T-shaped depression and is open not only at the face 44 but is also open along some of the length 48 at the sides of the rod 34. The middle of the depression 46 which forms the projection of the T-shape does not open into the sides of the rod 34 but is instead contained completely within the rod 34. The depression 46 extends for some depth into the rod 34 but does not extend along a majority of the length 48. The depression 46 has a shape complimentary to that of the sensor 12 so that the T-shaped projection of the sensor 12 can be inserted into the depression 46 and received therein.

The push rod base 32 features an indexing feature 42 that allows the installer to know the orientation of the attached rod 34 and hence the operative end 36 and therefore the engaged sensor 12. The indexing feature 42 is a depression on the terminal face of the push rod base 32 and is put into the terminal face 44 in the same orientation as the depression 46 and has a T-shape like that of the depression 46. The position of the indexing feature 42 will thus match that of the depression 46 since the rod 34 is rigidly attached to the push rod base 32. Although shown as a depression, the indexing feature 42 could be a projection in other embodiments upwards from the push rod base 32. In yet other arrangements, the indexing feature 42 could be writing or markings on the push rod base 32 or the rod 34.

Figure 6:
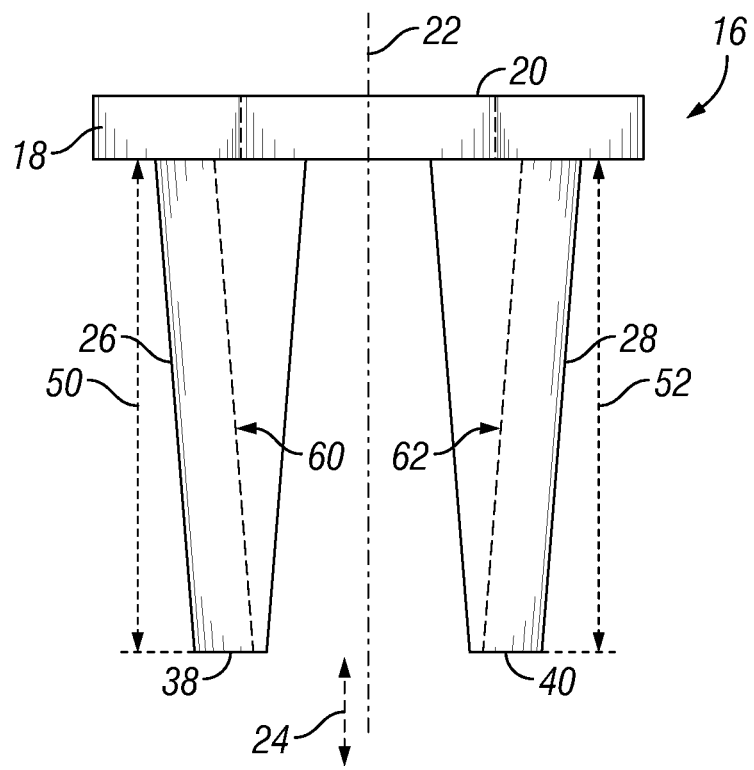
FIG. 6 is a side elevation view of a housing that is used to install a sensor into a tire.
Figure 7:
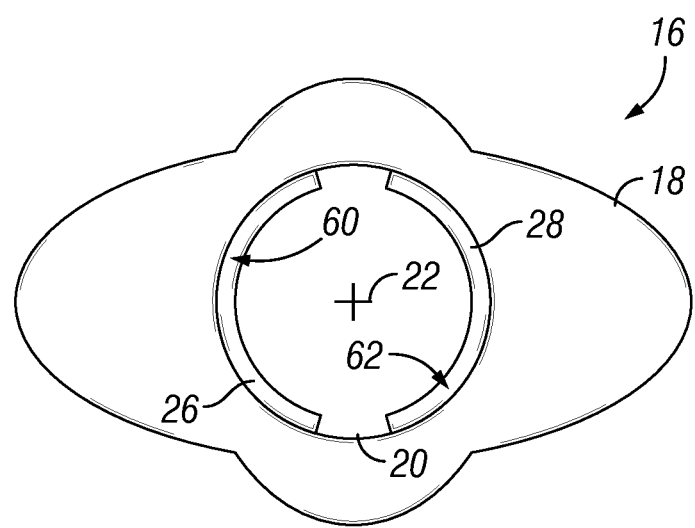
FIG. 7 is a top view of the housing of FIG. 6.
Figure 8:
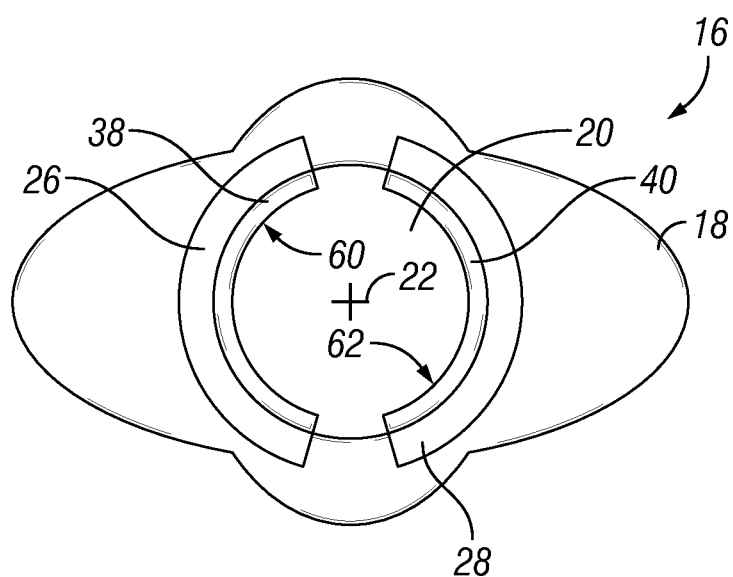
FIG. 8 is a bottom view of the housing of FIG. 6.

The apparatus 10 also includes a housing 16, and one such example of a housing 16 can be seen with reference to FIGS. 6-8. The housing 16 has a housing base 18 on one end, and a housing base opening 20 extends completely through the housing base 18. The housing base opening 20 is circular in shape but could be variously shaped in other embodiments. An axis 22 extends through the center of the housing base opening 20 and defines an axial direction 24. It is to be understood that even if the housing base opening 20 were a shape other than circular, the axis 22 and the axial direction 24 would still be present. In this regard, the axis 22 and the axial direction 24 are included and are not dependent upon the presence of a circular shaped housing base opening 20 but exist regardless of the particular shape of the housing base opening 20. A first finger 26 and a second finger 28 extend from the housing base 18 and are positioned about the housing base opening 20 so that they do not extend into the housing base opening 20. The fingers 26 and 28 both extend in the axial direction 24 away from the housing base 18 such that the first finger 26 has a length 50 and terminates at a terminal end 38, and such that the second finger 28 has a length 52 and terminates a second finger terminal end 40. The lengths 50 and 52 are the same as one another. The length 48 of the rod 34 is greater than the length 50 of the first finger 26, and the length 48 of the rod 34 is greater than the length 52 of the second finger 28.

The fingers 26, 28 extend from the housing base 18 so as to extend towards the axis 22 immediately upon extension from the housing base 18. In this regard, some portion of the fingers 26, 28 from the point of extension from the housing base 18 in the axial direction 24, moves closer to the axis 22 the farther they extend from the housing base 18 in the axial direction 24. The entire fingers 26, 28 can extend towards the axis 22 immediately upon extension from the housing base 18, or only a part of the fingers 26, 28 can extend in this manner immediately upon extension. In some instances, the portion of the fingers 26, 28 that extend inwards towards the axis 22 immediately upon extension from the housing base 18 are the outer surfaces of the fingers 26, 28. The first finger 26 has a first finger inner surface 60 that could likewise extend towards the axis 22 immediately upon extension from the housing base 18, and the second finger 28 has a second finger inner surface 62 that is the portion of the second finger 28 that likewise could extend towards the axis 22 immediately upon extension from the housing base 18. At some point in the present design, the inner surfaces 60, 62 are closer to the axis 22 at a location farther from the housing base 18 than at a location closer to the housing base 18 in the axial direction 24. However, in some instances the immediate extension toward the axis 22 is not present for the inner surfaces 60, 62 but is instead present for the outer surface of the fingers 26, 28.

If the fingers 26, 28 did not immediately move towards the axis 22 then they would be arranged in a manner in which upon extension from the housing base 18 they remain the same distance from the axis 22 or extend in distance from the axis 22. This same or expanding configuration could extend for some length in the axial direction 24 at which some point the fingers 26, 28 could move in towards the axis 22. The design with fingers 26, 28 moving immediately inwards from the housing base 18 allows for a stronger engagement between the fingers 26, 28 and housing base 18 and allows the housing 16 to be made of less strong material and allows for the fingers 16, 28 and housing base 18 to be molded, 3D printed or otherwise made of a single piece. Further, a continuously inward moving finger 26, 28 will spring back better, provide a more consistent sliding of the sensor 12 into the container 54, and allows the housing 16 to more easily open the container 54 for placement of the sensor 12 within the container 54.

With reference in particular to FIG. 7, it can be seen that the fingers 26, 28 begin radially outward from the housing base opening 20 so as not to be seen but then extend inwards towards the axis 22 so to be located within the footprint of the housing base opening 20 although not actually inside of the housing base opening 20. As shown more clearly in FIG. 8, the first finger 26 has a terminal end 38 that is farthest from the housing base 18 in the axial direction 24, and the second finger 28 has a terminal end 40 that is the portion of the second finger 28 farthest from the housing base 18 in the axial direction 24. The terminal ends 38, 40 are adjacent portions of the inner surfaces 60, 62 that are closest to the axis 22. FIG. 6 shows the housing 16 in a side view in which the terminal ends 38, 40 are at the bottom of the figure and are the portions of the fingers 26, 28 that are farthest from the housing base 18. The first finger 26 extends a length 50 in the axial direction 24 from the housing base 18 to the terminal end 38. The second finger 28 extends a length 52 from the housing base 18 to its terminal end 40.

The first and second fingers 26, 28 have some flexibility relative to the housing base 18 so that they can flex from the position shown in FIG. 6-8 towards the axis 22. The housing base 18, first finger 26, and second finger 28 can all be made of the same material and may be integrally formed with one another in some embodiments. The fingers 26, 28 could be flexible in that if force is applied to them, they move inwards towards the axis 22 from the positions shown, and once the force is removed, they spring back outwards from the axis 22 back into the positions illustrated. The fingers 26, 28 are spaced from one another and do not engage one another but could engage one another in other embodiments. The fingers 26, 28 are symmetrically spaced about the axis 22. The housing 16 can be constructed so that only two fingers 26, 28 are present and no more than two fingers 26, 28 are included in the housing 16. In other designs of the housing 16, three of the fingers are present and yet in still further designs more than three fingers are included. However, the preferred embodiment of the apparatus 10 includes only two fingers 26, 28 and no more than two of the fingers 26, 28. There are gaps between the two fingers 26, 28 that grow in size upon extension of the fingers 26, 28 in the axial direction 24 away from the housing base 18. Each one of the fingers 26, 28 has an outer surface opposite its inner surface 60, 62 and these outer surfaces are arranged so that the two fingers 26, 28 have a wider base at the housing base 18 than at the terminal ends 38, 40. In this regard, the distance of the outer surfaces of the fingers 26, 28 at the housing base 18 to the axis 22 is greater than the distance of the outer surfaces at the terminal ends 38, 40 to the axis 22. The outer surfaces of the fingers 26, 28 lay along the surface of a cone that would have the housing base 18 at its base and that would extend in the axial direction 24 away from the housing base 18.

Figure 9:
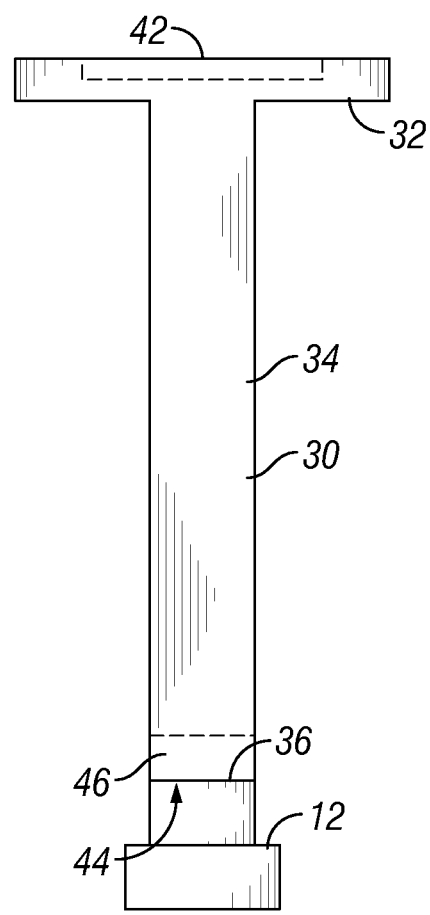
FIG. 9 is a side elevation view of a push rod with a sensor on the operative end set for install into a tire.

In order to install a sensor 12 into a container 54, the sensor 12 is first placed onto the operative end 36 of the push rod 30. FIG. 9 shows such an engagement. The T-shaped projections at the top of the sensor 12 fit within the depression 46, and the top surface of the smaller cylindrical feature of the sensor 12 engages the terminal face 44 so that this top surface and the larger cylindrical feature of the sensor 12 remain outside of the depression 46. The engagement of the T-shaped projections of the sensor 12 within the corresponding T-shaped depression 46 can be tight enough to somewhat hold the sensor 12 onto the operative end 36, but loose enough so that if a minor amount of force were applied to the sensor 12 it would be pushed off of the operative end 36.

Figure 10:
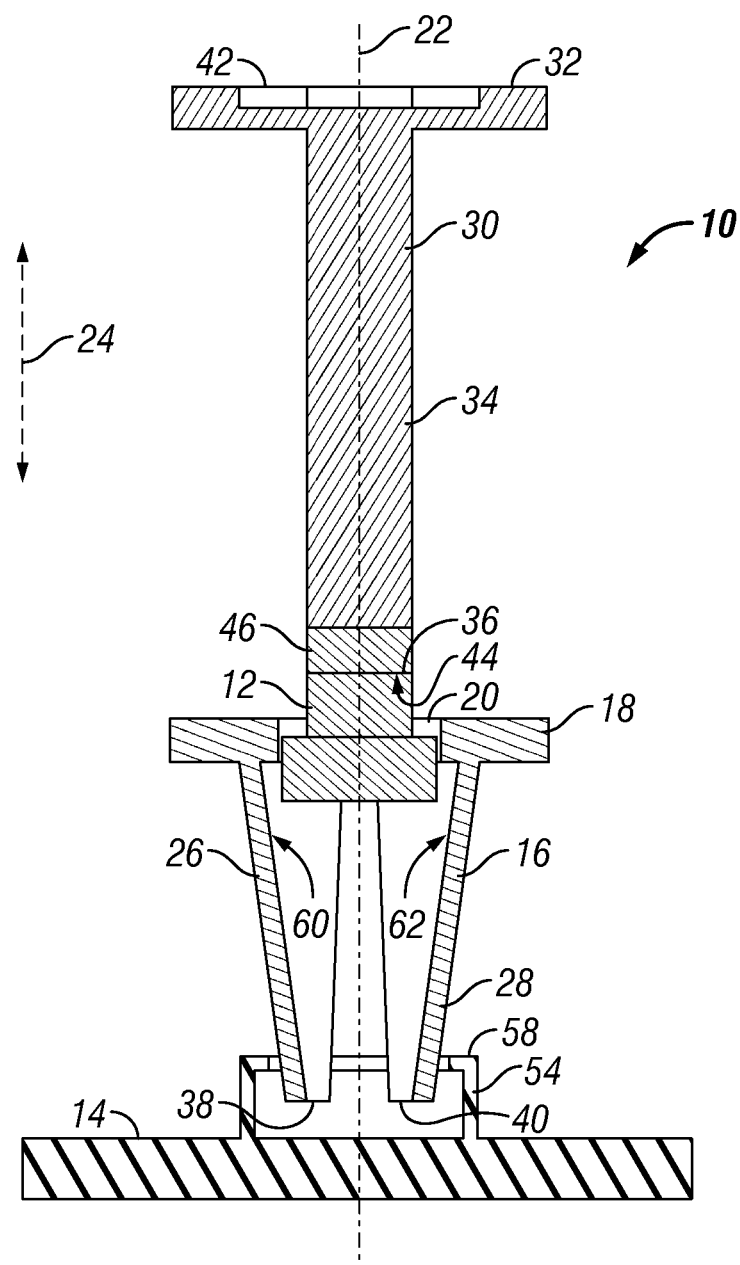
FIG. 10 is a cross-sectional view of the apparatus positioned into a container with the sensor moving through a housing base opening of the housing base.

The installer may place the housing 16 within the container 54 as shown in FIG. 10. In this regard, the terminal ends 38, 40 are placed within the container 54 and can either engage the tire 14 outer surface within the container 54 or may be spaced from the bottom of the container 54. The fingers 26, 38 may be free from contact with the lip 58 or can engage them in other embodiments. In some installs, the ends of the fingers 26, 28 can be pushed into the container 54 and held therein with some force by the container 54 as the rubber of the container 54 wraps around and holds the ends of the fingers 26, 28. The sensor 12, with the fingers 26, 28 within the container 54, is pushed through the housing base opening 20 and then positioned between the fingers 26, 28. As shown in FIG. 10, the sensor 12 is shown still inside of the housing base opening 20 and the push rod 30 is completely outside of the housing 16 and thus completely spaced from the housing 16 in the axial direction 24. The sensor 12 has a diameter or width that is smaller than the diameter or width of the housing base opening 20 so that the sensor 12 can move through. The installer may at this point rotate the push rod 30 360 degrees about the axis 22 to thus rotate the sensor 12 360 degrees about axis 22. The installer may use the indexing feature 42 to orient the sensor 12 at the desired orientation angle about the axis 22 so that the sensor 12 is thus oriented as the user desires with respect to the tire 14.

Figure 11:
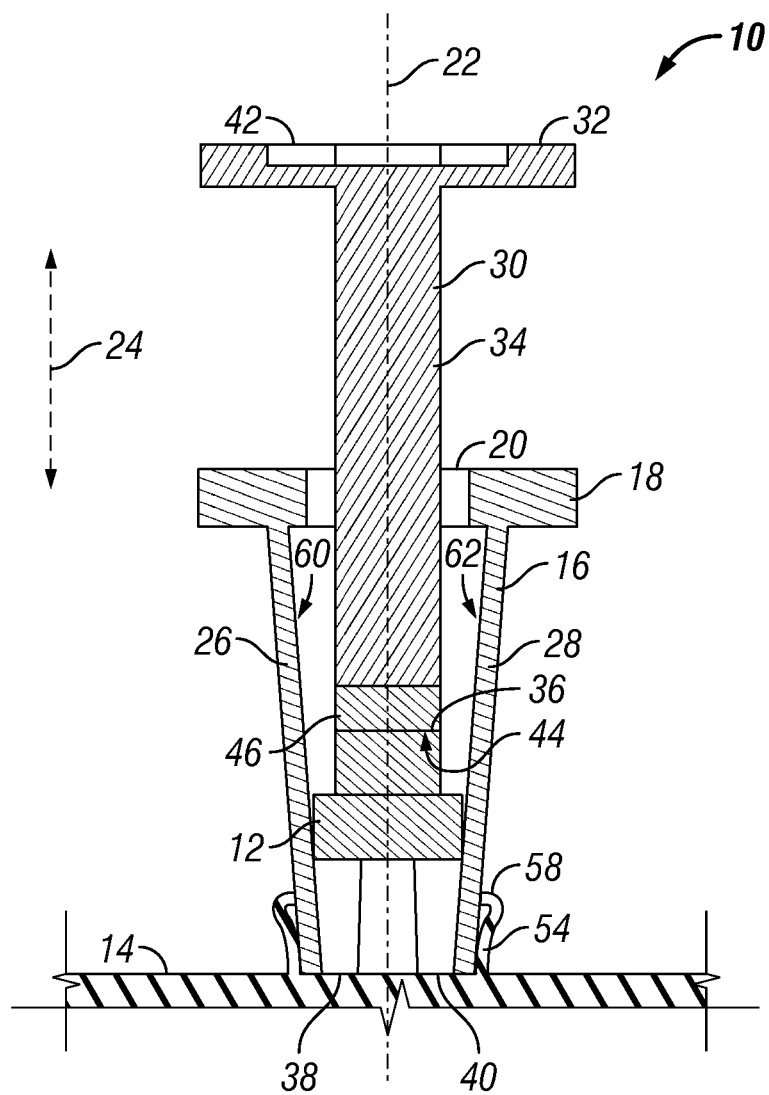
FIG. 11 is a cross-sectional view of the sensor engaging the fingers and pushing them outwards to in turn open up the container.

FIG. 11 shows the housing 16 pushed into the container 54 to such an extent that the terminal ends 38, 40 engage the tire 14 at the bottom of the container 54. The installer manipulates the push rod 30 by pushing the push rod base 32 so that the sensor 12 is moved in the axial direction 24 towards the container 54. The rod 34 is small enough in width or diameter so that it can move through the housing base opening 20. The sensor 12 engages the inner surface 60 and inner surface 62 and upon so doing pushes the first and second fingers 26, 28 outwards from the axis 22. This pushing occurs without the fingers 26, 28 being engaged by any part of the push rod 30, and in particular without being engaged by the rod 34. This outward movement of the fingers 26, 28 causes the container 54 to open up and the fingers 26, 28 engage the lip 58 and push it outwards and away from the axis 22. If necessary, the installer can again adjust the rotational position of the sensor 12 by using the indexing feature 42 and manipulating the push rod base 32 to spin the push rod 30 about the axis 22. The axial movement of the sensor 12 results in the push rod base 32 being moved closer to the housing base 18 in the axial direction 24.

Figure 12:
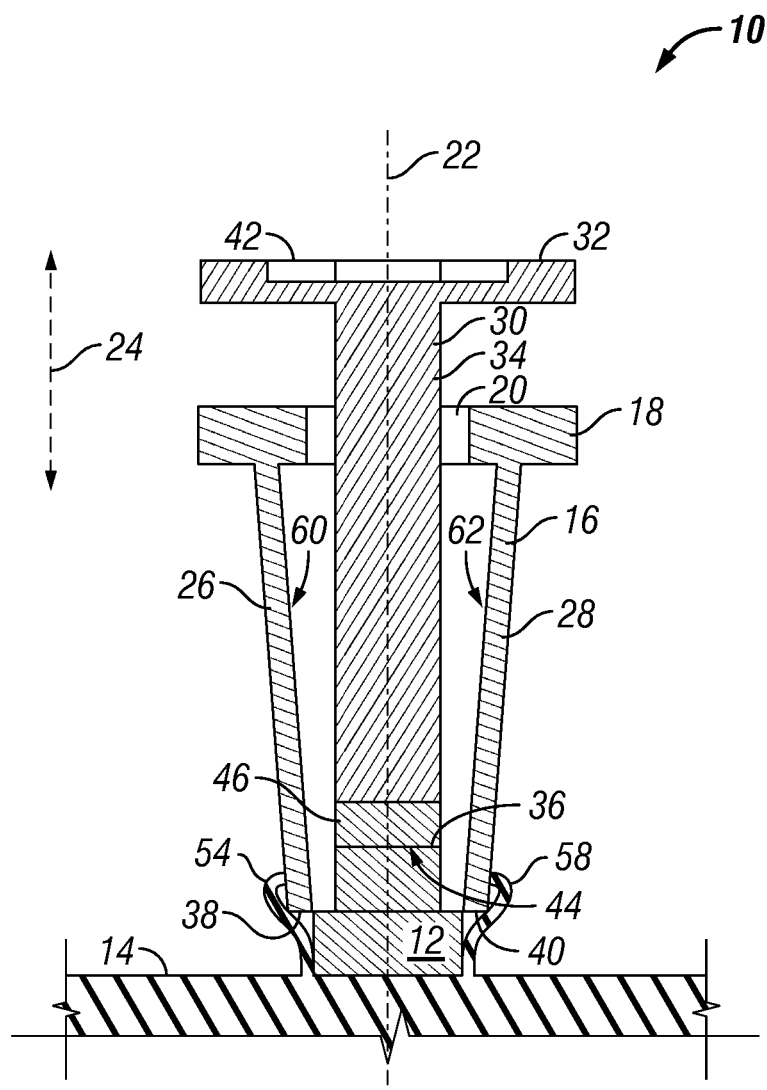
FIG. 12 is a cross-sectional view of the sensor placed completely into the container with the housing pushed back.

Continued application of force to the push rod base 32 causes the sensor 12 to be moved in the axial direction 24 until it is positioned within the container 54 as shown in FIG. 12. This pushing causes the push rod base 32 to continue to be moved closer to the housing base 18 in the axial direction 24. The sensor 12 will continue to engage the inner surfaces 60, 62 until portions of the sensor 12 move past the terminal ends 38, 40 to allow the fingers 26, 28 to achieve their maximum deflection away from the axis 22 upon being pushed outwards by the sensor 12. Positive pressure can be maintained on the sensor 12 by the push rod 30 forcing the sensor 12 into the container 54 and against the bottom of the container 54/upper surface of the tire 14, while at the same time the terminal ends 38, 40 are forced out of the container 54 such that they move in the axial direction 24 away from the container 54 so that they are out of engagement with the bottom of the container 54/upper surface of the tire 14. The housing 16 snaps back away and out of the container 54 upon the sensor 12 moving past the fingers 26, 28 and being disposed within the container 54. In FIG. 12 the fingers 26, 28 are still between and engage both the sensor 12 and the container 54. The lip 58 engages the outer surfaces of the fingers 26, 28, and the fingers 26, 28 are at their maximum degree of deflection away from the axis 22 in FIG. 12. The sensor 12 is positioned inside of the container 54, and the user may again rotate the sensor 12 by rotating the push rod base 32 through observation of the indexing feature 42 as a guide should the sensor 12 not be properly oriented within the container 54. This adjustment could be harder to make due to the squeezing of the container 54 onto the sensor 12 but still may be possible. Although shown as still being present within at least the top of the container 54, it is to be understood that in other embodiments upon placement of the sensor 12 fully within the container 54 the housing 16 will snap back and out of the container 54 so that the fingers 26, 28 are pushed back in the axial direction 24 and not within and free from contact with any portion of the container 54. In other instances, the user can simply grasp the housing base 18 and apply some force to it to pull the wedged fingers 26, 28 from the container 54 should the fingers 26, 28 at their terminal ends 38, 40 be wedged between the container 54 and sensor 12 upon the placement of the sensor 12.

The length 48 of the rod 34 is greater than the lengths 50, 52 of the first and second fingers 26, 28. In this regard, the push rod base 32 need not engage the housing base 18 during installation at any of the aforementioned steps of the install sequence. The longer length 48 allows for positive pressure to be applied on the sensor 12 during install so that when removing the housing 16, positive pressure on the sensor 12 is still applied even during this process. This positive pressure keeps the sensor 12 in the correct spot during the install process and ensures the sensor 12 remain properly seated within the container 54.

Figure 13:
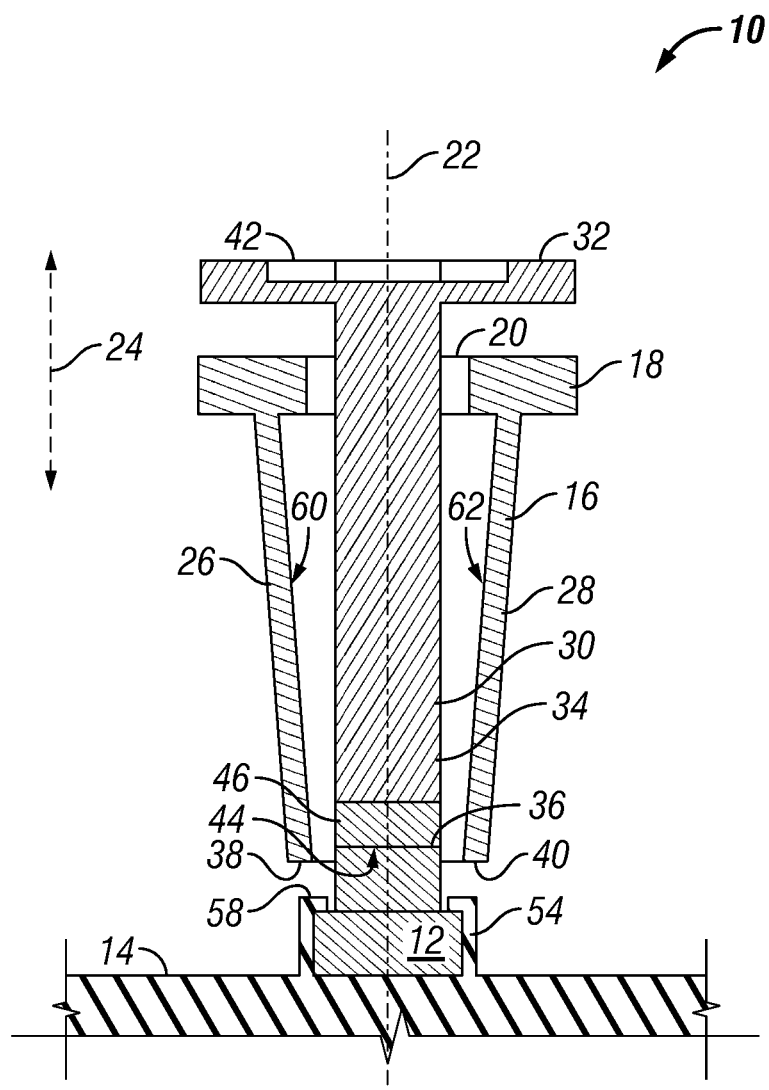
FIG. 13 is a cross-sectional view of the sensor completely installed within the container and the housing and push rod after install of the sensor.

Once the fingers 26, 28 are moved out of the container 54, the apparatus 10, sensor 12, and tire 14 may assume the configuration as shown with reference to FIG. 13. With the housing 16 removed from the container 54, the container 54 including its lip 58 wraps around the sensor 12 and holds it in place for use within the tire 14. If the operative end 36 still engages the sensor 12, the installer may pull back on the push rod base 32 to apply force sufficient to disengage the T-shaped top of the sensor 12 from the depression 46 to effect disengagement of the sensor 12 with the apparatus 10. The push rod 30, including the rod 34 may not engage any part of the housing 16 during the install. The sensor 12 can engage the fingers 26, 28 while no portion of the push rod 30 engages the fingers 26, 28 or any other part of the housing 16. However, in other embodiments it may be the case that the rod 34 or other parts of the push rod 30 does in fact engage the fingers 26, 28 or other part of the housing 16. As such, embodiments do exist where the housing 16 engages the push rod 30 at one or more points during the installation. Once the fingers 26, 28 no longer have any force applied to them, they will spring back away from the axis 22 into their normal, at rest position as shown in FIG. 13. One design feature to note in FIG. 13 is that the sensor 12 is fully contained within the container 54 without the container 54 at all engaging the housing 16 or the push rod 30. Since the container 54 is not pressing on either of these two components 16 or 30 when the sensor 12 is inserted, there is no danger of having the sensor be pushed out of desired place or orientation within the container 54 when the apparatus 10 disengages the sensor 12. This design is distinguished from a design in which the fingers 26, 28 first disengage the container 54 follows subsequently by the push rod 30. In the disclosed arrangement, not only do the fingers 26, 28 disengage the container 54 last, the push rod 30 at no point even engages the container 54.

The housing 16 and push rod 30 may each be formed through molding and can be a single piece. The housing 16 and push rod 30 may be made out of plastic, metal, or other materials. In some embodiments, both the housing 16 and the push rod 30 are made from 3D printing. The design of no more than 2 fingers 26, 28 allows the housing 16 to be manufactured through a 3D printing process as the fingers 26, 28 can be made of a size sufficient to allow them to function. It may be the case that if more than two fingers 26, 28 were used the resulting size of the fingers would be smaller and thus not as strong which would prevent them from being manufactured via a 3D printing process.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

I claim:

1. An apparatus for installing a sensor into a tire, comprising:
    a housing that has a housing base that defines a housing base opening, wherein an axis extends through the housing base opening and has an axial direction, wherein the housing has a first finger that extends from the housing base such that a first finger inner surface extends both away from the housing base in the axial direction and towards the axis upon initial extension from the housing base to be located towards the axis without external force applied to the first finger, wherein a first finger edge extends from the housing base to a terminal first finger end, wherein the housing has a second finger that extends from the housing base, wherein a second finger inner surface extends both away from the housing base in the axial direction and towards the axis upon initial extension from the housing base, wherein a second finger edge extends from the housing base to a terminal second finger end, wherein a gap is defined between the first finger edge and the second finger edge and continuously grows in size upon extension of the first and second finger away from the housing base in the axial direction; and
    a push rod that has a push rod base and a rod that extends from the push rod base, wherein the rod has an operative end configured for engagement with the sensor, wherein the rod is configured for moving through the housing base opening such that the operative end is configured for moving through the housing base opening, wherein the operative end has a terminal face and a depression that extends into the rod from the terminal face that is configured for receiving the sensor, and wherein the depression opens at the terminal face and opens at a side of the rod that is spaced from the terminal face.

2. The apparatus as set forth in claim 1, wherein the first finger inner surface extends continuously towards the axis along an entire length of the first finger from the housing base to the terminal first finger end.

3. The apparatus as set forth in claim 1, wherein the housing does not have any more fingers than the first finger and the second finger.

4. The apparatus as set forth claim 1, wherein the housing base opening is circular in shape, and wherein the rod is cylindrical in shape along an entire length of the rod from the push rod base to the operative end.

5. The apparatus as set forth in claim 1, wherein the rod is configured for rotating 360 degrees about the axis and within the housing base opening, and wherein the axis extends through the rod.

6. The apparatus as set forth in claim 1, wherein the push rod base has an indexing feature that identifies an orientation of the operative end relative to the tire.

7. The apparatus as set forth in claim 1, wherein the housing base, the first finger, and the second finger are integrally formed with one another and are made of the same material as one another;
    wherein the push rod base and the rod are integrally formed with one another and are made of the same material as one another.

8. The apparatus as set forth in claim 1, wherein the rod is configured to remain free from contact with the first finger and the second finger when the sensor is configured for being pushed by the rod into engagement with the first finger and the second finger and then past and out of engagement with the first finger and the second finger.

9. The apparatus as set forth in claim 1, wherein the first finger and the second finger have outer surfaces that are shaped and sized so as to form portions of a common conical surface.

10. The apparatus as set forth in claim 1, wherein the rod has a length in the axial direction that is longer than a length of the first finger in the axial direction, and wherein the length of the rod in the axial direction is longer than a length of the second finger in the axial direction.

11. The apparatus as set forth in claim 1, wherein the second finger inner surface extends from the housing base such that the second finger inner surface extends both away from the housing base in the axial direction and towards the axis upon initial extension from the housing base to be located towards the axis without external force applied to the second finger.

12. The apparatus as set forth in claim 11, wherein the first finger inner surface extends continuously towards the axis along an entire length of the first finger from the housing base to the terminal first finger end; and wherein the second finger inner surface extends continuously towards the axis along an entire length of the second finger from the housing base to the terminal second finger end.

* * * * *